United States Patent
Jin et al.

(10) Patent No.: US 10,571,579 B2
(45) Date of Patent: Feb. 25, 2020

(54) DUAL-MODE RADIATION DETECTOR

(71) Applicant: General Electric Company, Schenectady, NY (US)

(72) Inventors: Yannan Jin, Schenectady, NY (US); Geng Fu, Clifton Park, NY (US); Peter Michael Edic, Albany, NY (US); Brian David Yanoff, Schenectady, NY (US); Jianjun Guo, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/004,214

(22) Filed: Jan. 22, 2016

(65) Prior Publication Data

US 2017/0212250 A1     Jul. 27, 2017

(51) Int. Cl.
*G01T 1/20*     (2006.01)
*G01T 1/24*     (2006.01)
*G01T 1/17*     (2006.01)

(52) U.S. Cl.
CPC .............. *G01T 1/2006* (2013.01); *G01T 1/17* (2013.01); *G01T 1/2018* (2013.01); *G01T 1/247* (2013.01)

(58) Field of Classification Search
CPC ..... G01T 1/2018; G01T 1/249; G01T 1/2006; G01T 1/247; G01T 1/202; G01T 3/06; G01T 1/00; G01T 1/1617; G01T 1/17
USPC ........................................................ 250/362
See application file for complete search history.

(56) References Cited

U.S. PATENT DOCUMENTS

| | | | |
|---|---|---|---|
| 7,403,589 B1 | 7/2008 | Short et al. | |
| 7,433,443 B1 | 10/2008 | Tkaczyk et al. | |
| 7,488,945 B2 | 2/2009 | Li et al. | |
| 7,512,210 B2* | 3/2009 | Possin ................... | A61B 6/032 250/370.09 |
| 7,696,481 B2 | 4/2010 | Tkaczyk | |
| 7,885,372 B2 | 2/2011 | Edic et al. | |
| 8,160,200 B2* | 4/2012 | Tkaczyk ................ | A61B 6/032 378/19 |
| 10,197,511 B2* | 2/2019 | Kato ..................... | G01N 23/046 |
| 2004/0017224 A1* | 1/2004 | Turner ................... | H03F 3/087 327/51 |
| 2006/0109949 A1 | 5/2006 | Tkaczyk et al. | |
| 2006/0109950 A1 | 5/2006 | Tkaczyk et al. | |
| 2007/0206721 A1* | 9/2007 | Tkaczyk ................ | A61B 6/032 378/19 |
| 2008/0099689 A1* | 5/2008 | Nygard ................. | G01T 1/2018 250/370.09 |

(Continued)

FOREIGN PATENT DOCUMENTS

WO     2014176328 A1     10/2014

OTHER PUBLICATIONS

Kruger, H., et al.; "CIX—A Detector for Spectral Enhanced X-ray Imaging by Simultaneous Counting and Integrating", SPIE Medical Imaging Conference, San Diego, Feb. 15, 2008, pp. 1-12.

(Continued)

*Primary Examiner* — Taeho Jo

(57) ABSTRACT

A detector is described having readout electronics integrated in the photodetector layer. The detector may be configured to acquire both energy-integrated and photon-counting data. In one implementation, the detector is also configured with control logic to select between the jointly generated photon-counting and energy-integrated data.

18 Claims, 4 Drawing Sheets

(56) References Cited

U.S. PATENT DOCUMENTS

| | | | | |
|---|---|---|---|---|
| 2008/0240341 | A1* | 10/2008 | Possin | A61B 6/032 378/19 |
| 2009/0080601 | A1* | 3/2009 | Tkaczyk | G01T 1/249 378/19 |
| 2009/0121142 | A1* | 5/2009 | Heismann | G01T 1/2018 250/363.04 |
| 2009/0129538 | A1* | 5/2009 | Tkaczyk | A61B 6/032 378/5 |
| 2010/0090115 | A1* | 4/2010 | Lerch | G01T 1/161 250/366 |
| 2010/0102242 | A1* | 4/2010 | Burr | G01T 1/20 250/370.11 |
| 2010/0246919 | A1* | 9/2010 | Wainer | G01T 1/1647 382/131 |
| 2010/0303196 | A1* | 12/2010 | Zou | A61B 6/032 378/5 |
| 2010/0316184 | A1* | 12/2010 | Iwanczyk | A61B 6/032 378/19 |
| 2010/0329425 | A1 | 12/2010 | Guo et al. | |
| 2011/0243413 | A1* | 10/2011 | Tkaczyk | A61B 6/032 382/131 |
| 2011/0280367 | A1* | 11/2011 | Baeumer | A61B 6/032 378/9 |
| 2013/0148873 | A1* | 6/2013 | Arenson | G06T 11/005 382/132 |
| 2013/0256542 | A1* | 10/2013 | Soh | G01T 1/247 250/370.09 |
| 2014/0301534 | A1 | 10/2014 | Rao et al. | |
| 2014/0328465 | A1* | 11/2014 | Herrmann | G01T 1/17 378/62 |
| 2014/0332671 | A1* | 11/2014 | Lee | H03F 3/08 250/214 A |
| 2015/0223766 | A1* | 8/2015 | Besson | G01T 1/2985 378/5 |
| 2015/0346354 | A1* | 12/2015 | Arakita | G01T 1/1606 378/19 |
| 2016/0095559 | A1* | 4/2016 | Gagnon | A61B 6/4241 600/425 |
| 2016/0206255 | A1* | 7/2016 | Gagnon | A61B 6/4241 |
| 2016/0216381 | A1* | 7/2016 | Nishihara | G01T 1/1644 |

OTHER PUBLICATIONS

Li, Liang, et al.; "Spectral CT Modeling and Reconstruction with Hybrid Detectors in Dynamic-Threshold-Based Counting and Integrating Modes", IEEE Transactions on Medical Imaging, vol. 34, No. 3, Mar. 2015, pp. 716-728.

Steadman et al., "A CMOS Photodiode Array With In-Pixel Data Acquisition System for Computed Tomography", IEEE Journal of Solid-State Circuits, vol. No. 39, Issue No. 7, pp. 1034-1043, Jul. 2004.

Nassalski et al., "Comparative Study of Scintillators for PET/CT Detectors", Nuclear Science Symposium Conference Record, 2005 IEEE, vol. No. 5, pp. 2823-2829, Oct. 2005.

Kraft et al., "Counting and Integrating Readout for Direct Conversion X-ray Imaging: Concept, Realization and First Prototype Measurements", IEEE Transactions on Nuclear Science, vol. No. 54, Issue No. 2, pp. 383-390, Apr. 2007.

Iwanczyk et al., "Photon-Counting Energy-Dispersive Detector Arrays for X-Ray Imaging", Chapter 3 from Book "Electronics for Radiation Detection", pp. 51-88, Jul. 2010.

\* cited by examiner

DUAL-MODE RADIATION DETECTOR

BACKGROUND

The subject matter disclosed herein relates to the fabrication and use of radiation detectors, including X-ray radiation detectors, having integrated electronic readout circuitry and capable of generating both photon-count and integrated-energy data.

Non-invasive imaging technologies allow images of the internal structures or features of a subject (patient, manufactured good, baggage, package, or passenger) to be obtained non-invasively. In particular, such non-invasive imaging technologies rely on various physical principles, such as the differential transmission of X-rays through the target volume or the reflection of acoustic waves, to acquire data and to construct images or otherwise represent the internal features of the subject.

Computed Tomography (CT) scanners typically operate by projecting fan-shaped or cone-shaped X-ray beams from an X-ray source. The X-ray source emits X-rays at numerous view angle positions about an object being imaged, such as a patient, which attenuates the X-ray beams as they traverse the object. The attenuated beams are detected by a set of detector elements which produce signals representing the intensity of the incident X-ray beams on the detector. The signals are processed to produce data representing the line integrals of the linear attenuation coefficients of the object along the X-ray paths. These signals are typically called "projection data" or just "projections". By using reconstruction techniques, such as filtered backprojection, useful images may be formulated from the projections. The images may in turn be associated to represent a volume or a volumetric rendering of a region of interest. In a medical context, pathologies or other structures of interest may then be located or identified from the reconstructed images or rendered volume.

Conventionally, radiation detectors can operate in an energy-integrating (i.e., readout of the total integrated energy deposited during an acquisition interval) mode or a photon-counting (each individual X-ray photon is detected) mode. Conventional scintillator-based photon-counting modes utilize silicon photomultipliers (SiPMs) that are expensive and not practical for high count rate applications such as CT. Thus, energy integration is the conventional mode for reading out X-ray detectors in most clinical applications. However, energy-integrating readout approaches operate poorly in low-flux imaging applications, where electronic noise associated with the detector readout operation may overwhelm the available signal. Further, in some applications, photon counts are of more interest than the total integrated energy information associated with energy-integrating approaches.

BRIEF DESCRIPTION

In one implementation, a radiation detector is provided. In accordance with this implementation, the radiation detector includes a radiation conversion layer configured to emit optical photons when exposed to X-rays and a light imager layer positioned proximate to the radiation conversion layer. The light imager layer includes an array of photodetector elements, each configured to generate electrical signals in response to the emitted optical photons that impact respective photodetector elements and readout circuitry located within the light imager panel and configured to read out analog signals from proximate photodetector elements. The readout circuitry is configured to generate both a first digital signal corresponding to total integrated X-ray energy incident on each respective photodetector element and a second digital signal corresponding to X-ray photon count incident on the radiation conversion layer coupled to each photodetector element for one or more energy ranges.

In a further implementation, a radiation detector is provided. In accordance with this implementation, the radiation detector includes a scintillator configured to emit optical photons when exposed to X-rays; an array of photodetectors, each photodetector configured to generate signals in response to optical photons emitted by the scintillator that impact the respective photodetector; and a plurality of front-end buffers, each front-end buffer configured to accumulate signals from one or more respective photodetectors of the array of photodetectors. For each respective front-end buffer, there is a charge digitizer configured to receive an analog output from the respective front-end buffer and to output a total integrated energy signal; an X-ray photon counter configured to receive the analog output from the respective front-end buffer and to output one or more X-ray counts corresponding to specific energy ranges; and a control circuit configured to receive both the total integrated energy signal and the one or more X-ray counts, to select at least one of the total integrated energy signal or the one or more X-ray counts as an output, and to output at least one of the selected total integrated energy signal and one or more X-ray counts as a digital output.

In an additional implementation, a method is provided for generating X-ray image data. In accordance with this method, a signal is read out from one or more detector elements to a front-end buffer. A total integrated energy signal is generated from an analog signal acquired from the front-end buffer. One or more X-ray counts are generated from the analog signal acquired from the front-end buffer. At least one of the total integrated energy signal or the one or more X-ray counts are selected. At least one of the selected total integrated energy signal or one or more X-ray counts are provided as a digital output.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
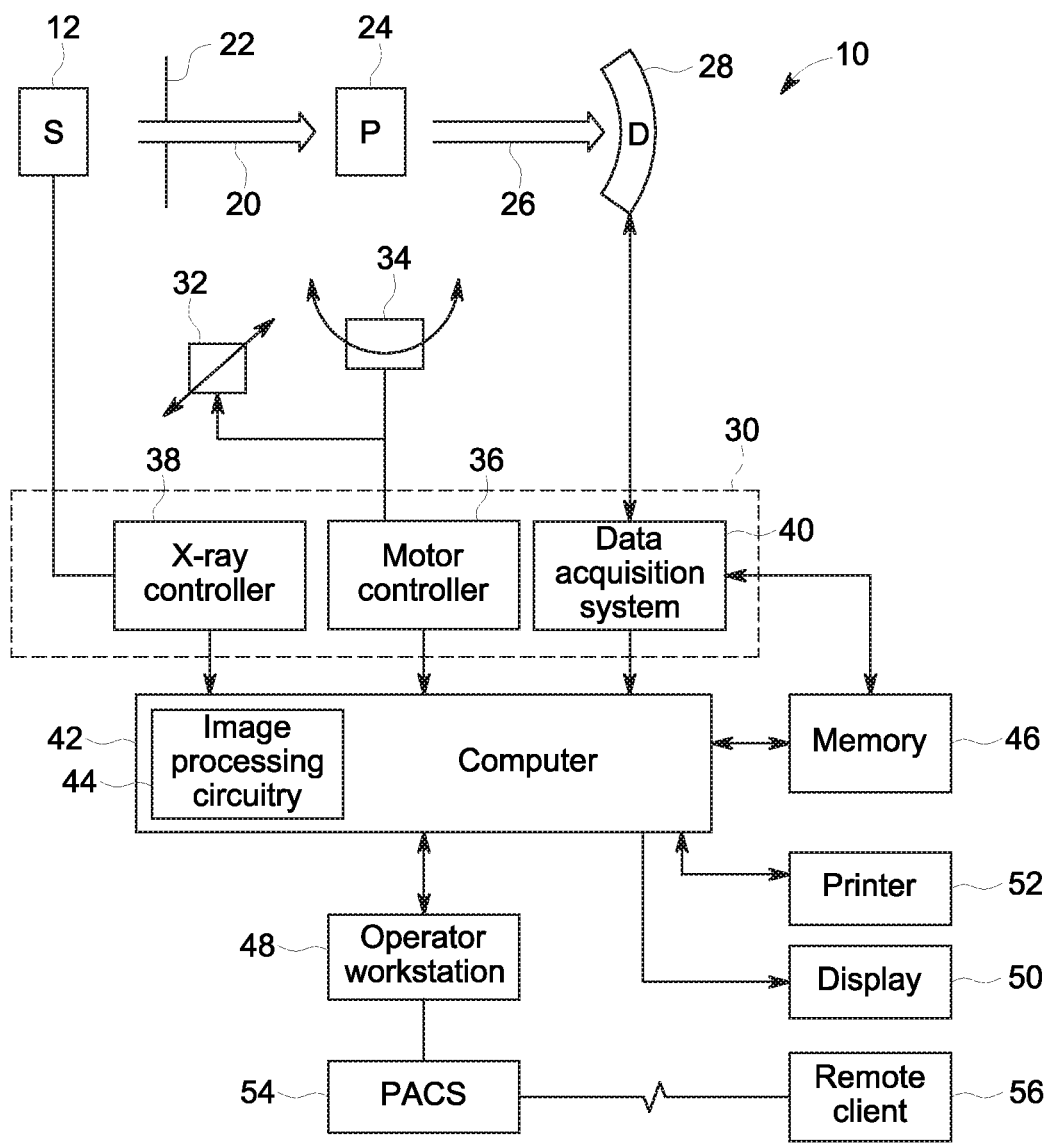
FIG. 1 is a schematic illustration of an embodiment of a Computed Tomography (CT) system configured to acquire CT images of a patient and to process the images in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While the following discussion is generally provided in the context of medical imaging, it should be appreciated that the present techniques are not limited to such medical contexts. Indeed, any examples and explanations provided in such a medical context is only to facilitate explanation by providing instances of real-world implementations and applications. However, the present approaches may also be utilized in other contexts, such as the non-destructive inspection of manufactured parts or goods (i.e., quality control or quality review applications), and/or the non-invasive inspection of packages, boxes, luggage, and so forth (i.e., security or screening applications).

The present approaches relate to the fabrication of X-ray radiation detectors using tiled silicon wafer and complementary metal-oxide-semiconductors (CMOS) techniques. In particular, fabrication and use of a radiation detector, such as for use in X-ray based imaging techniques (including but not limited to Computed Tomography (CT)), C-arm X-ray angiography, X-ray tomosynthesis, dual-energy imaging techniques, and X-ray radiography), is demonstrated where electronic readout circuitry is integrated with the respective photodetector on a single wafer (e.g., c-Si wafer or die) using CMOS techniques. In certain implementations, the integrated readout electronics reduces or minimizes parasitic impedance, thereby reducing associated noise, and correspondingly offers better noise performance in certain applications including low-dose or low-signal applications. The contemplated detector formed with integrated readout electronics will work in either front-illuminated or back-illuminated configurations.

In certain implementations, the low-noise characteristics of the integrated readout electronics may facilitate certain operations or actions when in use, such as grouping (i.e., binning) of pixels during a scanning operation (i.e., in real-time) to allow adaptive imaging during the scan operation itself. In one such example, the spatial resolution (i.e., effective pixel size) of all or part of the detector configuration may be adaptively controlled (i.e., selected, changed, or adjusted) during a scanning operation, such as by flexibly or adaptively binning grouped pixels or sub-pixels.

In addition, in certain approaches discussed herein the integrated readout electronics may be configured or programmed so as to allow both energy-integrating and photon-counting readout approaches, such as in parallel. In particular, the low-noise characteristics of the integrated readout electronics makes it possible to replace silicon photomultipliers (SiPMs) or avalanche photodiodes (APD) used in photon-counting operations with silicon photodiodes at a lower cost. This is in contrast to conventional approaches, where switching or other means are utilized to facilitate detector readout using only one of energy-integrating or photon-counting techniques. In accordance with the present approach, both energy-integrating (i.e., total integrated energy) and photon-counting data may be generated for the same exposure interval (e.g., an exposure and readout operation at a given view of a scan operation) and then a selection made as to which data to use in downstream processes (e.g., image reconstruction). In certain embodiments, detected X-ray intensity information acquired concurrently may be used in the selection between which type of data (i.e., photon counts or total integrated energy) to output for downstream processing.

With the preceding discussion in mind, FIG. 1 illustrates an embodiment of an imaging system 10 for acquiring and processing image data in accordance with aspects of the present disclosure. In the illustrated embodiment, system 10 is a Computed Tomography (CT) system designed to acquire X-ray projection data, to reconstruct the projection data into one or more tomographic images, and to process the image data for display and analysis. The depicted CT imaging system 10 includes an X-ray source 12. As discussed in detail herein, the source 12 may include one or more X-ray sources, such as an X-ray tube or one or more enclosures comprising solid state emission structures. The X-ray source 12, in accordance with certain contemplated embodiments, is configured to emit an X-ray beam 20 from one or more emission spots (e.g., focal spots), which may correspond to X-ray emission regions on a target structure (e.g., an anode structure) impacted by a directed electron beam.

In certain implementations, the source 12 may be positioned proximate to a filter assembly or beam shaper 22 that may be used to steer the X-ray beam 20, to define the shape and/or extent of a high-intensity region of the X-ray beam 20, to control or define the energy profile of the X-ray beam 20, and/or to otherwise limit X-ray exposure on those portions of the patient 24 not within a region of interest. In practice, the filter assembly or beam shaper 22 may be incorporated within the gantry between the source 12 and the imaged volume.

The X-ray beam 20 passes into a region in which the subject (e.g., a patient 24) or object of interest (e.g., manufactured component, baggage, package, and so forth) is positioned. The subject attenuates at least a portion of the X-rays 20, resulting in attenuated X-rays 26 that impact a detector array 28 formed by a plurality of detector elements (e.g., pixels or sub-pixels) as discussed herein. Each detector element produces an electrical signal that represents the intensity of the X-ray beam incident at the position of the detector element during an interval when the beam strikes the detector 28. Electrical signals are acquired and processed to generate one or more scan datasets. In implementations discussed herein, the detector 28 includes integrated readout circuitry and control logic, allowing both the output of digitized signals to downstream components and the adaptive operation of the detector 28, such as adaptive binning of the pixels of the detector 28. In the depicted example, the detector 28 is coupled to the system controller 30, which commands acquisition of the digital signals generated by the detector 28.

A system controller 30 commands operation of the imaging system 10 to execute filtration, examination and/or calibration protocols and to process the acquired data. With respect to the X-ray source 12, the system controller 30 furnishes power, focal spot location, control signals and so forth, for the X-ray examination sequences. In accordance with certain embodiments, the system controller 30 may control operation of the filter assembly 22, the CT gantry (or other structural support to which the X-ray source 12 and detector 28 are attached), and/or the translation and/or inclination of the patient support over the course of an examination.

In addition, the system controller 30, via a motor controller 36, may control operation of a linear positioning subsystem 32 and/or a rotational subsystem 34 used to move components of the imaging system 10 and/or the subject 24. The system controller 30 may include signal processing circuitry and associated memory circuitry. In such embodiments, the memory circuitry may store programs, routines, and/or encoded algorithms executed by the system controller 30 to operate the imaging system 10, including the X-ray source 12 and/or filter assembly 22, and to process the digital measurements acquired by the detector 28 in accordance with the steps and processes discussed herein. In one embodiment, the system controller 30 may be implemented as all or part of a processor-based system.

The source 12 may be controlled by an X-ray controller 38 contained within the system controller 30. The X-ray controller 38 may be configured to provide power, timing signals, and/or focal size and spot locations to the source 12. In addition, in some embodiments the X-ray controller 38 may be configured to selectively activate the source 12 such that tubes or emitters at different locations within the system 10 may be operated in synchrony with one another or independent of one another or to switch the source between different energy profiles during an imaging session.

The system controller 30 may include a data acquisition system (DAS) 40. The DAS 40 receives data collected by readout electronics of the detector 28, such as digital signals from the detector 28. The DAS 40 may then convert and/or process the data for subsequent processing by a processor-based system, such as a computer 42. In certain implementations discussed herein, circuitry within the detector 28 may convert analog signals of the photodetector to digital signals prior to transmission to the data acquisition system 40. The computer 42 may include or communicate with one or more non-transitory memory devices 46 that can store data processed by the computer 42, data to be processed by the computer 42, or instructions to be executed by a processor 44 of the computer 42. For example, a processor of the computer 42 may execute one or more sets of instructions stored on the memory 46, which may be a memory of the computer 42, a memory of the processor, firmware, or a similar instantiation.

The computer 42 may also be adapted to control features enabled by the system controller 30 (i.e., scanning operations and data acquisition), such as in response to commands and scanning parameters provided by an operator via an operator workstation 48. The system 10 may also include a display 50 coupled to the operator workstation 48 that allows the operator to view relevant system data, imaging parameters, raw imaging data, reconstructed data, contrast agent density maps produced in accordance with the present disclosure, and so forth. Additionally, the system 10 may include a printer 52 coupled to the operator workstation 48 and configured to print any desired measurement results. The display 50 and the printer 52 may also be connected to the computer 42 directly (as shown in FIG. 1) or via the operator workstation 48. Further, the operator workstation 48 may include or be coupled to a picture archiving and communications system (PACS) 54. PACS 54 may be coupled to a remote system or client 56, radiology department information system (RIS), hospital information system (HIS) or to an internal or external network, so that others at different locations can gain access to the image data.

With the preceding discussion of an overall imaging system 10 in mind, a brief discussion of a conventional detector arrangement is provided so as to better distinguish aspects of the present approach. In particular, turning to FIG. 2, a schematic view of a conventional X-ray detector is shown in cross section. The depicted conventional radiation detector of FIG. 2, has certain features in common with, and other features distinct from, the current radiation detector 28.

Figure 2:
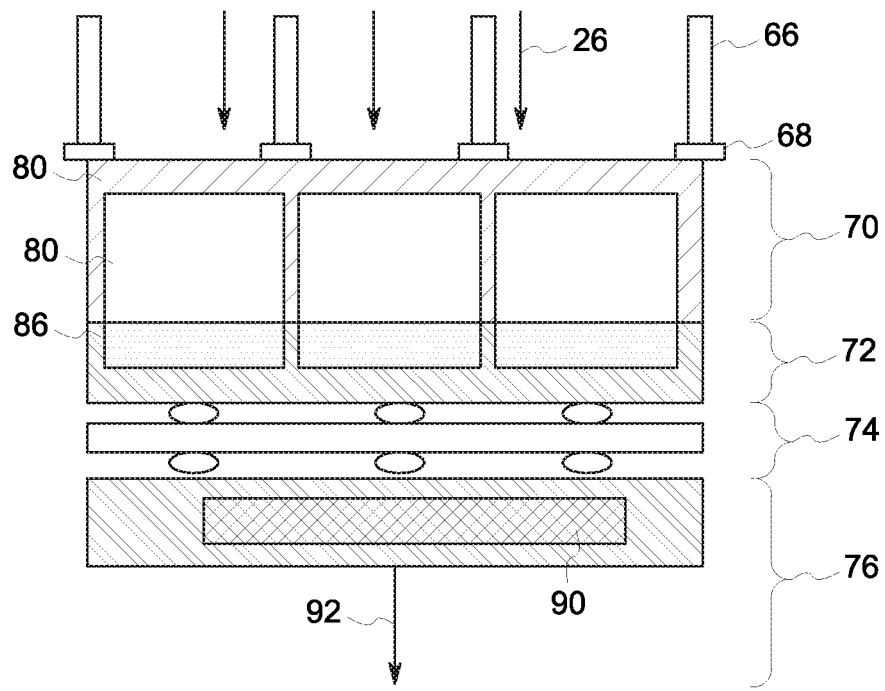
FIG. 2 depicts a cross-sectional view of components of a prior art radiation detector.

The depicted detector of FIG. 2 includes a radiation stopping or conversion layer 70, a light imager panel or layer 72 (typically provided as an array of photodetector element, e.g., pixels), a conductive path 74, and readout circuitry 76 configured to readout the light imager panel 72 but provided off-panel with respect to the light imager panel 72. Also depicted are a detector collimator 66 (e.g., anti-scatter grid) and associated grid plate 68 which may be present to reduce the incidence of scattered X-ray photons on the scintillation material 80.

The radiation stopping or conversion layer 70 typically may be provided as a layer of monolithic (i.e., continuous) or pixelated scintillation material 80 that emits lower-energy photons (e.g., optical wavelength photons) when exposed to higher-energy photons 26 (e.g., X-ray photons). In the depicted example, the scintillation material 80 is pixelated, being separated into individual elements by a light reflecting material 82 that also covers the scintillation material 80 to reduce loss of useful signal.

Low-energy photons emitted by the conversion layer 70 are detected at the light imager panel 72. In particular, the light imager panel 72 typically comprises photodiodes defining an array of photodetector elements (which may correspond to pixels 86 or sub-pixels). Optical photons incident on the photodetector elements result in charge being developed at the respective pixels 86 or sub-pixels which, when read out corresponds to the X-ray intensity incident at that location on the detector 28.

The charges at the respective pixels 86 are readout and reset by respective readout circuitry 76 (typically provided as one or more application specific integrated circuits—ASICs—90) that is typically fabricated off-panel with respect to the pixels 86 and which is electrically connected by conductive paths 74 in the form of flex circuitry, bump bonds, or other electrical interconnections. The readout circuitry (e.g., ASICs 90) may include circuitry for amplifier and analog-to-digital conversion (ADC), yielding digital signal 92 that is output from the readout circuitry 76 for subsequent processing.

The detector shown in FIG. 2, while providing useful radiation detection measurements, is notably complex in construction (requiring numerous electrical interconnections between components), with the 3D packaging adding to the cost and degrading performance due to the large interconnect capacitance. Thus, substantial noise is introduced to the measurements due to the length and nature of the electrical interconnect structures and the distance that the analog signal is propagated before digital conversion.

Figure 3:
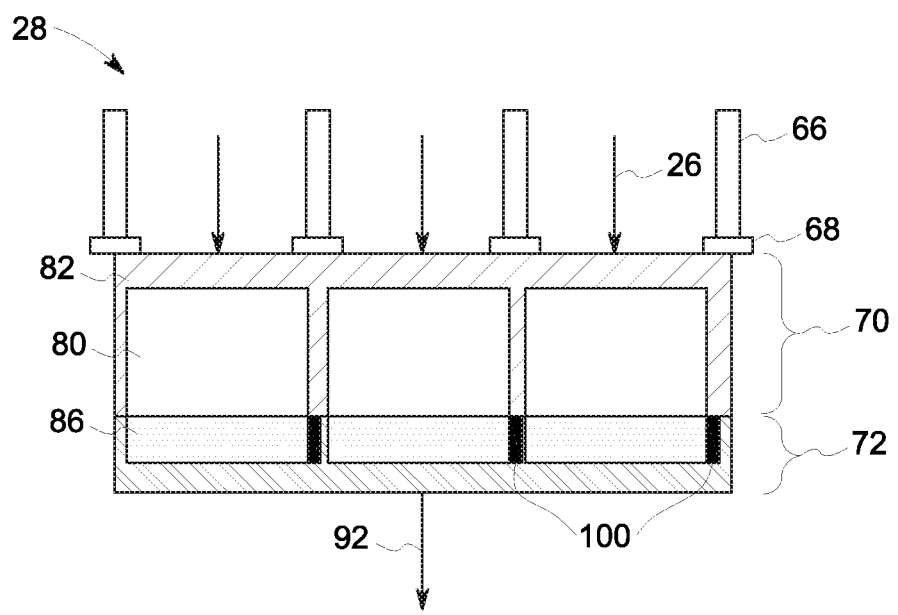
FIG. 3 depicts a cross-sectional view of components of a radiation detector having integrated readout electronics, in accordance with aspects of the present disclosure.

Turning to FIG. 3, in accordance with the present approach a detector 28 is provided that is simpler in design than the conventional detector shown in FIG. 2 and which is less subject to noise. In particular, the detector 28 of FIG. 3 includes integrated readout electronics 100 provided in the light imager panel 72 itself. Such an arrangement simplifies the overall design of the detector 28 and also reduces introduced noise by eliminating the conductive structures 74 used to transmit analog signals to the readout and conversion circuitry located off-panel in conventional designs. In this manner, a digital output 92 is output by the light imager panel 72 itself, rather than being generated by an off-panel module. As shown in the depicted example of FIG. 3, the integrated readout electronics 100 may be fabricated in the silicon region directly underneath the collimator 66 and grid plate 68, thus shielding the electronics 100 from incident radiation and reducing or eliminating the risk of radiation damage to the electronics 100.

Figure 4:
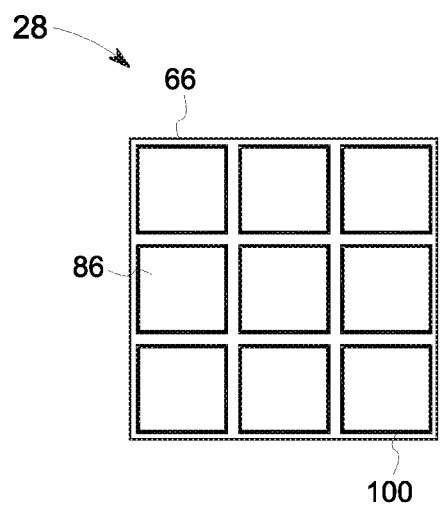
FIG. 4 depicts a top-view of placement of integrated readout electronics within a detector in conjunction with a 2D collimator grid, in accordance with aspects of the present disclosure.
Figure 5:
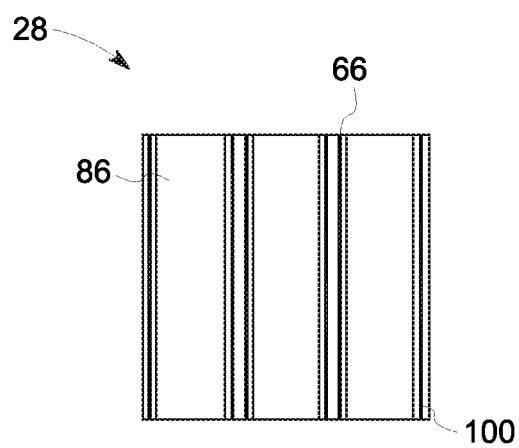
FIG. 5 depicts a top-view of placement of integrated readout electronics within a detector in conjunction with a 1D collimator grid, in accordance with aspects of the present disclosure.

With respect to the placement of the integrated readout electronics 100, various configurations are contemplated. By way of example, and turning to FIGS. 4-6, various configurations are shown that take into account the placement and orientation of a collimator 66 and associated grid plate 68. For example, turning to FIG. 4, a top view is provided of a portion of a detector 28 corresponding to a set of pixels 86. In this top view, the collimator 66 is provided as a two-dimensional (2D) collimator having collimation elements running in both depicted dimensions (i.e., in both the vertical and horizontal directions), thus forming a grid-like collimator wherein each pixel 86 lies within a cell of the 2D collimation grid. In this example, the integrated readout electronics 100 are provided in a ring or encircling configuration around each pixel 86 corresponding to the placement of the collimator 66 and grid plate. Alternatively, in FIG. 5, the integrated readout electronics 100 are provided in a linear or line configuration corresponding to, and underlying, the one-dimensional (1D) or linear arrangement of the collimator 66 separating linearly arranged pixel regions. Although shown as vertical in FIG. 5, collimator 66 may be configured in a horizontal configuration.

Figure 6:
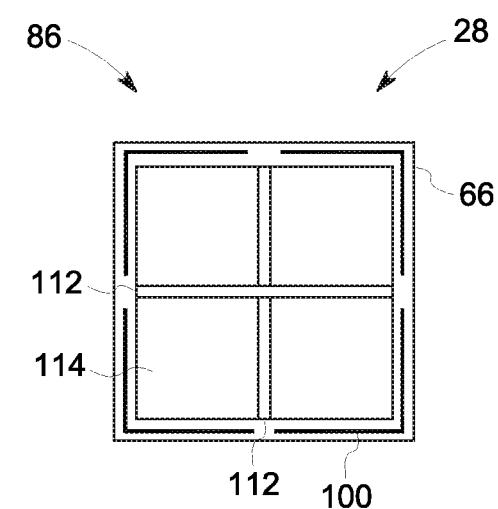
FIG. 6 depicts a top-view of placement of integrated readout electronics within a high-resolution detector in which pixels are divided into sub-pixels, in accordance with aspects of the present disclosure.

An alternative arrangement is provided in FIG. 6, which depicts a high-spatial resolution pixel 86 of a detector 28 in which the pixel 86 is divided into separately addressable sub-pixels 114, each of which has a separate photodiode. In this example, the collimator 66 is provided in a 2D configuration such that a pixel 86 (and corresponding sub-pixels 114) lie within a grid cell of the 2D collimator. In one implementation, the pixel 86 may be approximately 1 mm×1 mm, though the "active area" exposed to radiation may measure about 800 μm×800 μm due to the presence of the overlying collimator 66 and associated grid plate 68. In one such embodiment, each respective sub-pixel 114 may be approximately 400 μm×400 μm, with an insulator (such as air gap or reflector) 112 (<100 μm across) separating sub-pixels 114 within the pixel 86. In the depicted example, the integrated readout electronics 100 (here sub-pixel readout electronics) are provided along two-edges (i.e., as corner-pieces") of each sub-pixel 114 such that each sub-pixel 114 has corresponding readout electronics 100 that corresponds to the placement of the collimator 66, though underlying the collimator 66 with respect to incident radiation. As will be appreciated, the sub-pixels 114 in aggregate generally correspond to a single pixel 86 when binned but, when not binned, correspond to separate, individually addressable photodetector elements, each of which separately measures incident radiation. With this in mind, the present binning approaches, discussed below, allow such a high-resolution pixel to be adaptively read out as a single standard resolution pixel when binned or as four high-resolution sub-pixels when read out separately.

In certain implementations the detector elements (encompassing both pixels 86 and sub-pixels 114 as used herein) may be adaptively binned during operation using integrated readout electronics 100 so as to obtain all or only a portion of the projection data at higher resolution during a given imaging procedure.

Figure 7:
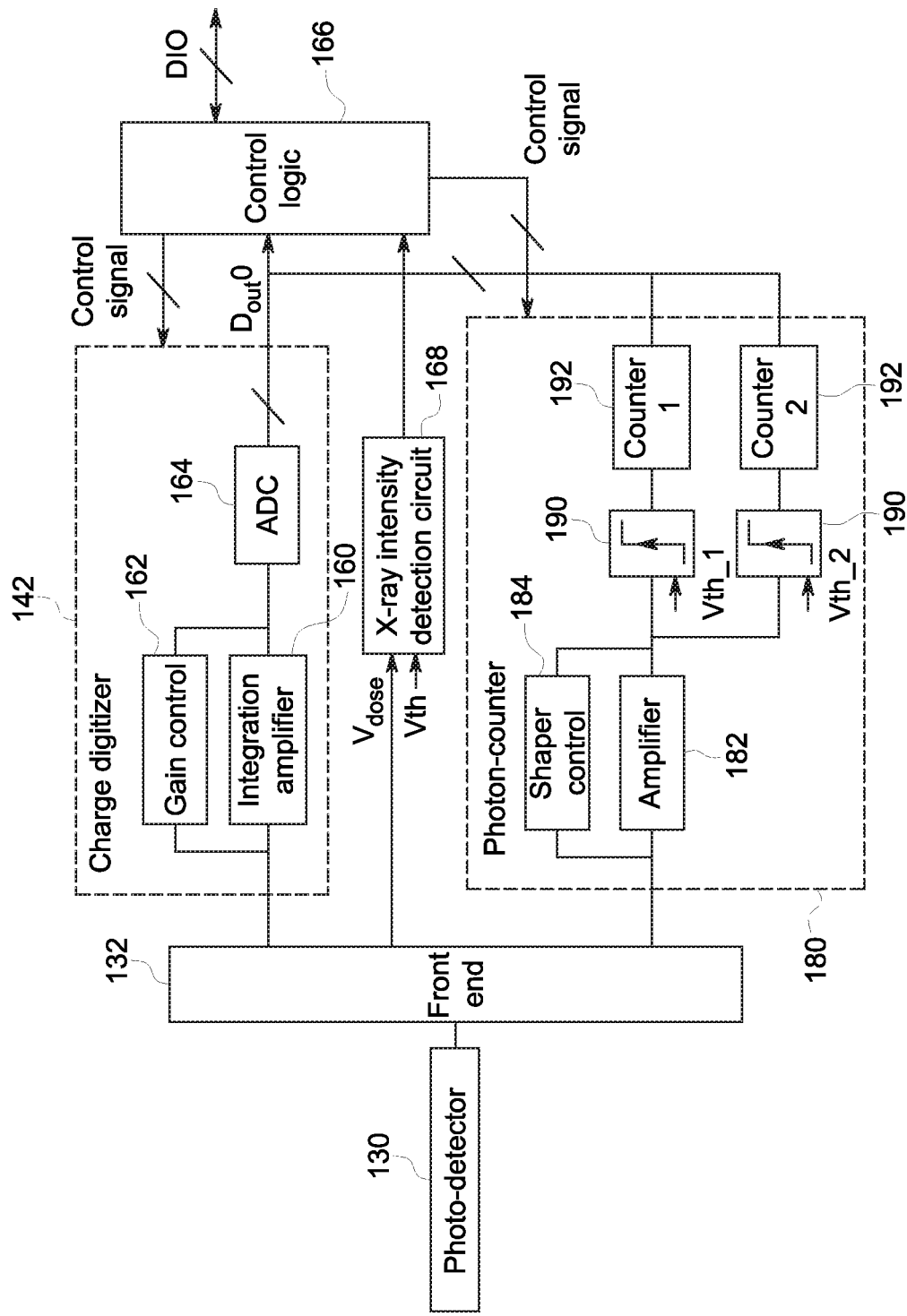
FIG. 7 depicts a generalized circuit view of photon-counting and energy-integrating circuitry, in accordance with aspects of the present disclosure.

In addition, as discussed in greater detail herein, the integrated readout electronics 100 of the detector 28 may be configured or programmed to facilitate acquisition of both energy-integration and photon-counting data of X-ray flux incident on the detector pixel 86 or sub-pixel 114. For example, the preceding discussion describes detector features (i.e., low-noise integrated readout circuitry within the light imager panel) consistent with the use of such combined-mode readout. Turning to FIG. 7, a generalized circuit and control logic overview is depicted to provide further explanation.

In this example, a photodetector 130 (which may be embodied within or as a pixel 86 or sub-pixel 114 of the detector 28) is shown as being subject to both photon-counting and energy-integration readout modes. Charge acquired at the photodetector 130 in response to incident X rays is periodically readout to a front-end buffer 132. The front-end buffer 132 is accessed by the energy-integrating and photon-counting circuitry discussed herein, as well as with X-ray intensity detection circuitry when present. For the purposes of the present discussion, it is to be understood that path lines denoted with a diagonal line or slash therethrough relate digital signals (e.g., digital outputs and/or digital control signals) and may have multiple bits so as to constitute a bus.

With respect to the energy integration readout, in the depicted example, the control circuitry 166 (i.e., control logic) is in communication with a charge digitizer 142 associated with the integrated readout circuitry 100 corresponding to the respective photodetector 130. In the depicted example, the charge digitizer 142 includes an integration amplifier 160 in communication with gain control circuitry 162. The amplified signal from the integration amplifier 160 is converted to a digital signal (e.g., $D_{out}0$) by analog-to-digital conversion (ADC) circuitry 164, where it is provided to the control logic circuitry 166. Based on the control logic executed by control logic circuitry 166, the operation of the charge digitizer 142, such as the operation of the gain control 162 and/or integration amplifier 160, may be adjusted, such as by a control signal from the control logic 166. As discussed herein, the control logic circuitry 166 may make a determination as to whether the digital signal provided by the charge amplifier 160 (i.e., the digital signal corresponding to the total integrated energy) is provided to downstream processes as a digital input/output signal (DIO). Such a determination may be made "on-the-fly" (i.e., during a scan operation), such as based upon the observed X-ray intensity during the scan.

With respect to the photon-counting readout, in the depicted example, the control logic circuitry 166 is also in communication with photon-counting circuitry 180 associated with the integrated readout circuitry 100 corresponding to the respective photodetector 130. In the depicted example, the photon-counting circuitry 180 includes an amplifier 182 in communication with shaper control circuitry 184. In the depicted example, the operation of the shaper control circuitry 184, and thus of the amplifier 182, may be modified or controlled in response to control signals generated by the control logic 166.

The amplified signal from the amplifier 182 is compared against one or more thresholds using one or more suitablyconfigured, programmed thresholding circuits 190. For example, the thresholding circuits 190, in one form, may simply pass signals above or below a specified threshold or between two thresholds. In this manner, thresholds may be established corresponding to one or more energy ranges (e.g., high-energy signals corresponding to X-rays equal to or above 65 keV, low-energy signals corresponding to X-rays equal to or below 65 keV, and so forth). In one implementation, a single threshold or a pair of thresholds may be utilized to discriminate signals into high- and low-energy bins or ranges, which may be used in a dual-energy context. In other implementations, additional thresholds may be utilized to sort observations into multiple ranges or bins of configurable granularity so that a full or partial spectrum of discrete energy bins or ranges can be populated and counted during a scan.

In such implementations, each energy range or bin may be associated with a digital counter 192 that counts observations within each energy range and outputs a digital count corresponding to the number of observations falling within an energy range over the course of a scan or time interval. These digital counts may be provided to the control logic circuitry 166 during a scan, along with the corresponding digital total integrated energy signal. Because the provided X-ray photon-count data corresponds to counts within the energy ranges of interest, the output can benefit from optimal energy weighting and be less subject to electronic noise. As such, the X-ray photon count data may be preferred in low-signal scenarios where even quantum noise may be significant in view of the available signal. The control logic circuitry 166 may make a determination as to whether the digital signal provided by the photon counting circuitry 180 (i.e., the digital counts within one or more energy ranges or bins) is provided to downstream processes as a digital input/output signal (DIO).

In the depicted example, the front-end buffer 132 is also accessed by an X-ray intensity detection circuit 168. The X-ray intensity detection circuit 168 outputs a control signal or measurement to the control logic circuitry 166. This output may be indicative of X-ray flux (i.e., X-ray intensity) seen at the photodetector 130 at the measurement interval in question, and thus may provide an indication to the control logic as to whether the current exposure corresponds to a low-signal or flux exposure or to a high-signal or flux exposure. This observed X-ray intensity may be a factor used by the control logic circuitry 166 in determining whether the photon-counting measurements or the energy-integrating measurements are provided to downstream processes. By way of example, X-ray photon flux measured below a specified threshold (i.e., low-signal) may cause control logic 166 to output the digital photon-count data, due to the relative insensitivity of such count data to electronic noise and the ability to apply energy-weighting schemes, for processing and image reconstruction. Conversely, X-ray photon flux measured above a specified threshold (i.e., high-signal) may be unsuitable for photon counting due to limitations in the count rate capability of the detector. As a result, at observed high-signal levels, the control logic 166 may instead be programmed to output the digital energy-integration data for processing or image reconstruction.

As X-ray intensity or flux measures may be obtained in real-time during a scan operation, the detector 28 may be operated in a dual-mode (i.e., energy integrating and photon counting) and selection between the photon-counting and energy-integration data may be adaptive during a scan. In this manner, the control circuit 166 may instantaneously switch between providing photon-counting and energy-integration data within a given acquisition. Other relevant factors in this selection process may include the nature of the application, e.g., dual-energy imaging, material decomposition imaging, nature of contrast enhancement and so forth. In addition, the dual-mode detector 28, capable of acquiring photon-counting data, may be advantageously used in certain scenarios, such as with a voltage switching or fast voltage switching X-ray source 12 that alternates between emitting at two or more different energy spectra (e.g., an 80 kVp low-energy spectrum and a 140 kVp high-energy spectrum). When used with such a switching X-ray source, the energy binning options in a photon-counting mode may be performed more efficiently or with more bins so as to obtain more useful multi-energy data.

Technical effects of the invention include a detector having readout electronics integrated in the photodetector layer. The detector may be configured to acquire both energy-integrated and photon-counting data and control logic to select between the jointly generated data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A radiation detector, comprising:
 a radiation conversion layer configured to emit optical photons when exposed to X-rays;
 a light imager layer positioned proximate to the radiation conversion layer, the light imager layer; comprising:
  an array of photodetector elements, each configured to generate electrical signals in response to the emitted optical photons that impact respective photodetector elements;
  an integrated readout circuitry located within the light imager panel and configured to read out analog signals from proximate photodetector elements, wherein the integrated readout circuitry is configured to generate both a first digital signal corresponding to total integrated X-ray energy incident on each respective photodetector element and a second digital signal corresponding to X-ray photon count incident on the radiation conversion layer coupled to each photodetector element for one or more energy ranges,
  wherein the readout circuitry further comprises control logic configured to receive both the first digital signal and the second digital signal and to adaptively select during a scan operation at least one of the first digital signal and the second digital signal based on a specified threshold of incident X-ray intensity, and instantaneously switch between providing data corresponding to the total integrated X-ray energy, and the X-ray photon count, to output for downstream processing; and
  an X-ray intensity detector circuitry configured to receive the analog signals from the respective photodetector elements and to output a signal level based on the incident X-ray intensity to the control logic that is used to select which of the at least one of the first digital signal and the second digital signal is output for downstream processing.

2. The radiation detector of claim 1, wherein the control logic generates one or more control signals used to control one or both of a gain associated with the generation of the first digital signal or a shaper control associated with the generation of the second digital signal.

3. The radiation detector of claim 1, wherein the first digital signal is generated by a charge digitizer of the readout circuitry and the second digital signal is generated by a photon counter of the readout circuitry.

4. The radiation detector of claim 3, wherein the charge digitizer comprises:
an integration amplifier configured to receive an analog signal from a respective photodetector element;
an analog-to-digital converter configured to receive an amplified output of the integration amplifier; and
a gain control configured to control operation of the integration amplifier.

5. The radiation detector of claim 3, wherein the photon counter comprises:
an amplifier configured to receive an analog signal from a respective photodetector element;
a shaper controller configured to control operation of the amplifier;
one or more thresholding circuits configured to sort amplified signals into energy ranges based on one or more X-ray equivalent energy thresholds; and
one or more counters configured to output counts of X-rays sorted into each X-ray equivalent energy range.

6. The radiation detector of claim 1, wherein the second digital signal comprises a first count of high-energy X-rays and a second count of low-energy X-rays.

7. A radiation detector comprising:
a scintillator configured to emit optical photons when exposed to X-rays;
an array of photodetectors, each photodetector configured to generate signals in response to optical photons emitted by the scintillator that impact the respective photodetector;
a plurality of front-end buffers, each front-end buffer configured to accumulate signals from one or more respective photodetectors of the array of photodetectors; wherein for each respective front-end buffer there is:
a charge digitizer configured to receive an analog output from the respective front-end buffer and to output a total integrated energy signal;
an X-ray photon counter configured to receive the analog output from the respective front-end buffer and to output one or more X-ray counts corresponding to specific energy ranges;
a control circuit configured to receive both the total integrated energy signal and the one or more X-ray counts, to adaptively select during a scan operation at least one of the total integrated energy signal and the one or more X-ray counts as an output based on a specified threshold of incident X-ray intensity, and instantaneously switch between providing data corresponding to the total integrated energy signal, and the one or more X-ray counts, to output at least one of the selected total integrated energy signal and one or more X-ray counts as a digital output; and
an X-ray intensity detector circuitry configured to receive the analog signals from the respective photodetector elements and to output a signal level based on the incident X-ray intensity to the control logic that is used to select which of the at least one of the first digital signal and the second digital signal is output for downstream processing.

8. The radiation detector of claim 7, wherein the scintillator comprises a pixelated scintillator.

9. The radiation detector of claim 7, wherein the charge digitizer comprises:
an integration amplifier configured to receive an analog signal from the respective front-end buffer;
an analog-to-digital converter configured to receive an amplified output of the integration amplifier; and
a gain control configured to control operation of the integration amplifier.

10. The radiation detector of claim 7, wherein the X-ray counter comprises:
an amplifier configured to receive an analog signal from a respective front-end buffer;
a shaper controller configured to control operation of the amplifier;
one or more thresholding circuits configured to sort amplified signals into energy bins based on one or more energy thresholds; and
one or more counters configured to output the counts of X-rays sorted into each energy range.

11. The radiation detector of claim 7, wherein for each front-end buffer there is also an X-ray intensity detector circuit configured to receive the analog output from the respective front-end buffer and to output a signal level based on the incident X-ray intensity to the control circuit.

12. The radiation detector of claim 11, wherein the control circuit selects at least one of the total energy signal and the one or more X-ray counts as the output based upon the signal level.

13. The radiation detector of claim 7, wherein the one or more X-ray counts comprise a high-energy X-ray count and a low-energy X-ray count.

14. A method for generating X-ray image data, comprising:
reading out signal from one or more detector elements to a front-end buffer;
generating a total integrated energy signal from an analog signal acquired from the front-end buffer;
generating one or more X-ray counts from the analog signal acquired from the front-end buffer;
adaptively selecting during a scan operation at least one of the total integrated energy signal and the one or more X-ray counts based on a specified threshold of incident X-ray intensity, and instantaneously switching between providing data corresponding to the total integrated energy signal, and the one or more X-ray counts; and
providing as a digital output at least one of the selected total integrated energy signal and one or more X-ray counts.

15. The method of claim 14, comprising:
generating a measure of X-ray intensity or flux from the analog signal acquired from the front-end buffer.

16. The method of claim 14, wherein generating the total integrated energy signal comprises:
performing an integration amplification on the analog signal to generate an amplified integrated signal; and
performing an analog-to-digital conversion on the amplified integrated signal to generate the total integrated energy signal.

17. The method of claim 14, wherein generating the one or more X-ray counts comprises:
performing an amplification of the analog signal to generate an amplified signal;

comparing the amplified signal to one or more thresholds; and based upon the comparison, generating a count in one of a plurality of energy ranges.

18. The method of claim 14, wherein the acts of reading out signal, generating a total integrated energy signal, generating one or more X-ray counts, selecting at least one of the total integrated energy signal and the one or more photon counts, and providing the digital output are performed by readout electronics integrated with the photodetector elements.

* * * * *